United States Patent [19]

Gotoh et al.

[11] Patent Number: 4,888,533
[45] Date of Patent: Dec. 19, 1989

[54] BRUSHLESS DC MOTOR

[76] Inventors: Makoto Gotoh, 1-18, 2-chome, Naruo-Cho, Nishinomiya-shi, Hyogo-ken 663; Kouji Hamaoka, 4-459,, Onji kitamachi, Yao-shi, Osaka-fu 581, both of Japan

[21] Appl. No.: 144,923
[22] PCT Filed: Apr. 25, 1986
[86] PCT No.: PCT/JP86/00207
§ 371 Date: Feb. 22, 1988
§ 102(e) Date: Feb. 22, 1988
[87] PCT Pub. No.: WO87/06780
PCT Pub. Date: Nov. 5, 1987
[51] Int. Cl.$^4$ .............................................. H02P 1/00
[52] U.S. Cl. ...................................... 318/524; 318/64; 318/71; 363/78
[58] Field of Search ................. 363/98, 76, 78, 79, 363/80; 318/524, 71, 75, 62, 64, 776, 778

[56] References Cited

FOREIGN PATENT DOCUMENTS

| 0160385 | 10/1982 | Japan | 318/254 |
| 0160386 | 10/1982 | Japan | 318/254 |
| 0135378 | 6/1986 | Japan | 318/254 |
| 0135379 | 6/1986 | Japan | 318/254 |
| 0135386 | 6/1986 | Japan | 318/254 |
| 0135387 | 6/1986 | Japan | 318/254 |

Primary Examiner—William M. Shoop, Jr.
Assistant Examiner—Gary J. Romano
Attorney, Agent, or Firm—Cushman, Darby and Cushman

[57] ABSTRACT

A brushless DC motor useful as a driving source of a refrigerant compressor of a refrigerating apparatus or a fan. A position detecting means generates a control signal by detecting the terminal voltage on input-output terminals current to three-phase rotor drive coils. Filters convert the detected terminal voltages to smoothed signals. A mixing means generates three kinds of mixed signal from the smoothed signal and comparing means generates the control signal for switching a current path to the three-phase coils by a signal made by comparing the mixed signal with the smoothed signal. The current path to the coils is switched by a switching-driving part in turn on the basis of the control signal of the position detecting means.

The present invention provides a brushless DC motor wherein current flowing to the drive coils can be switched without special position detecting elements.

9 Claims, 13 Drawing Sheets

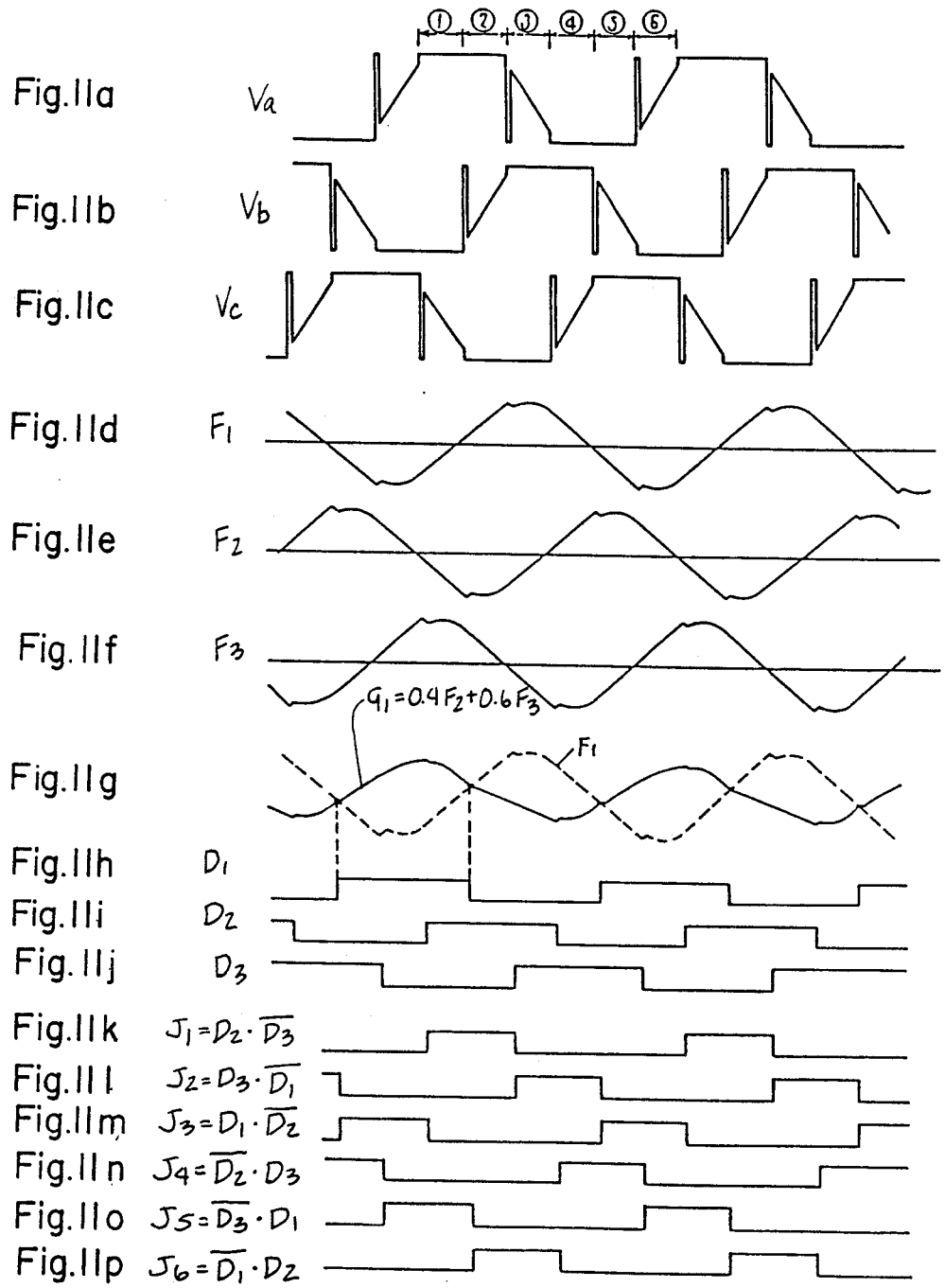

30: Start accelerator

156: Monostable circuit

BRUSHLESS DC MOTOR

TECHNICAL FIELD

The present invention relates to a brushless DC motor which is to be used as a driving source of a refrigerant compressor of a refrigerating apparatus or a fan.

BACKGROUND ART

In a conventional brushless DC motor, three or more position detecting elements are required to switch current paths to a three phase coil.

FIG. 1 shows an example of the construction of a conventional brushless DC motor. The rotating position of a rotor 1 composed of a permanent magnet is detected by hall elements 2a, 2b and 2c. The electrical states of first driving transistors 4a, 4b, 4c and second driving transistors 5a, 5b, 5c are switched and controlled by a processing circuit 3 corresponding to the rotor detecting signals, and the current paths to the three phase coils 6a, 6b, 6c are switched. As mentioned above, in the case that hall elements 2a, 2b, 2c are used as the position detecting elements, the number of parts of the motor increases, and there is a disadvantage that the circuit is complicated. Moreover, in the case that such a brushless DC motor is used as a motor for a compressor, the hall elements are used in a high temperature and a high voltage state because a large amount of current flows, and therefore, reliability or life time is seriously diminished.

DISCLOSURE OF INVENTION

The present invention, by detection of a rotor position by using a terminal voltage appearing at input and output terminals for currents to three phase coils, purposes to provide a brushless DC motor which does not use at all any exclusive position detecting elements.

Furthermore, since the present invention enables stable detection of a rotor position by using the terminal voltage issuing on the input and output terminals of the three phase coils, any position detecting element (Hall element) which is exclusively used to detect position is not required, and, unstable phenomenon accompanied with detection of the terminal voltage including spike voltages is avoidable.

The above-mentioned object of the present invention, is realized by a construction mentioned below. Namely, the brushless DC motor of the present invention comprises: a rotor having N pairs (N is an integer) of magnetic poles, which is constituted by a permanent magnet, a group of three phase coils interlinking magnetic flux of the magnetic field of the above-mentioned rotor, a group of first driving transistors forming current paths from a direct current power source to the above-mentioned three phase coils, a group of second driving transistors forming current return paths from the above-mentioned three phase coils to the above-mentioned direct current power source, a group of first diodes in parallel across the input terminals and output terminals of the above-mentioned first driving transistors, a group of second diodes in parallel across the input terminals and output terminals of the above-mentioned second driving transistors, position detecting means for generating control signals by detecting terminal voltage of input and output terminals for the current to the above-mentioned three phase coils, and switching-driving means for outputting switching signals to the above-mentioned first driving transistors and second driving transistors on the basis of the control signal of the above-mentioned position detecting means and for switching and flowing current to the above-mentioned coils in turn. The above-mentioned position detecting means produces three kinds of smoothed signal from the terminal voltage of the respective terminals of the above-mentioned coils to produce three kinds of mixed signals from the respective smoothed signals and an output signal by comparing the smoothed signals with the mixed signals, to switch and to control the current flowing state of the above-mentioned first transistors and second transistors by using the generated signals as a control signal from the position detecting means.

BRIEF DESCRIPTION OF DRAWINGS

FIG. 11a–FIG. 11p are figures of waveforms for elucidating operation of the embodiment of FIG. 8;

BEST MODE FOR CARRYING OUT THE INVENTION

Hereafter, an embodiment of the present invention is elucidated referring to the figures.

Figure 1:
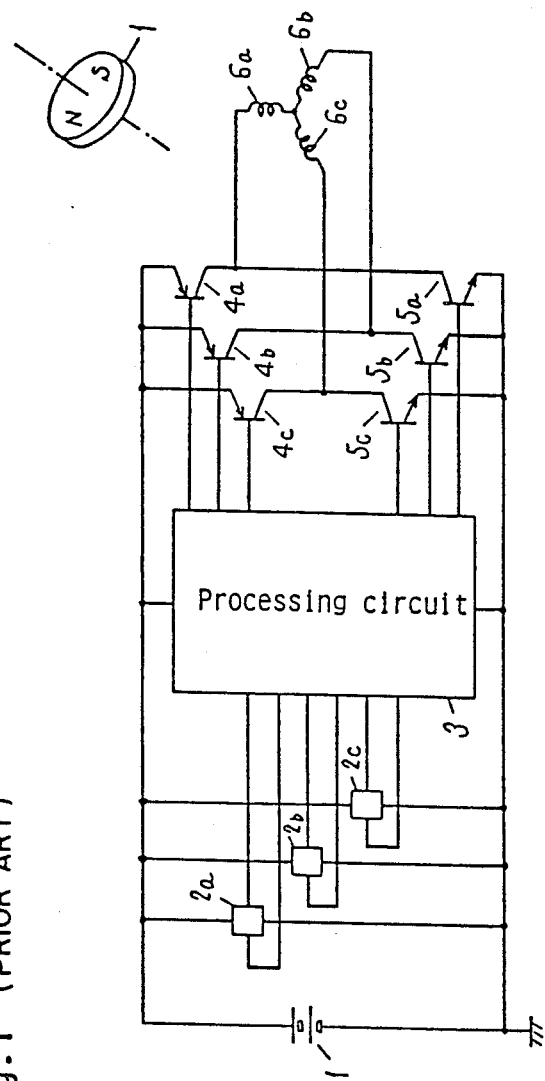
FIG. 1 is the starting circuit of the conventional brushless DC motor.
Figure 2:
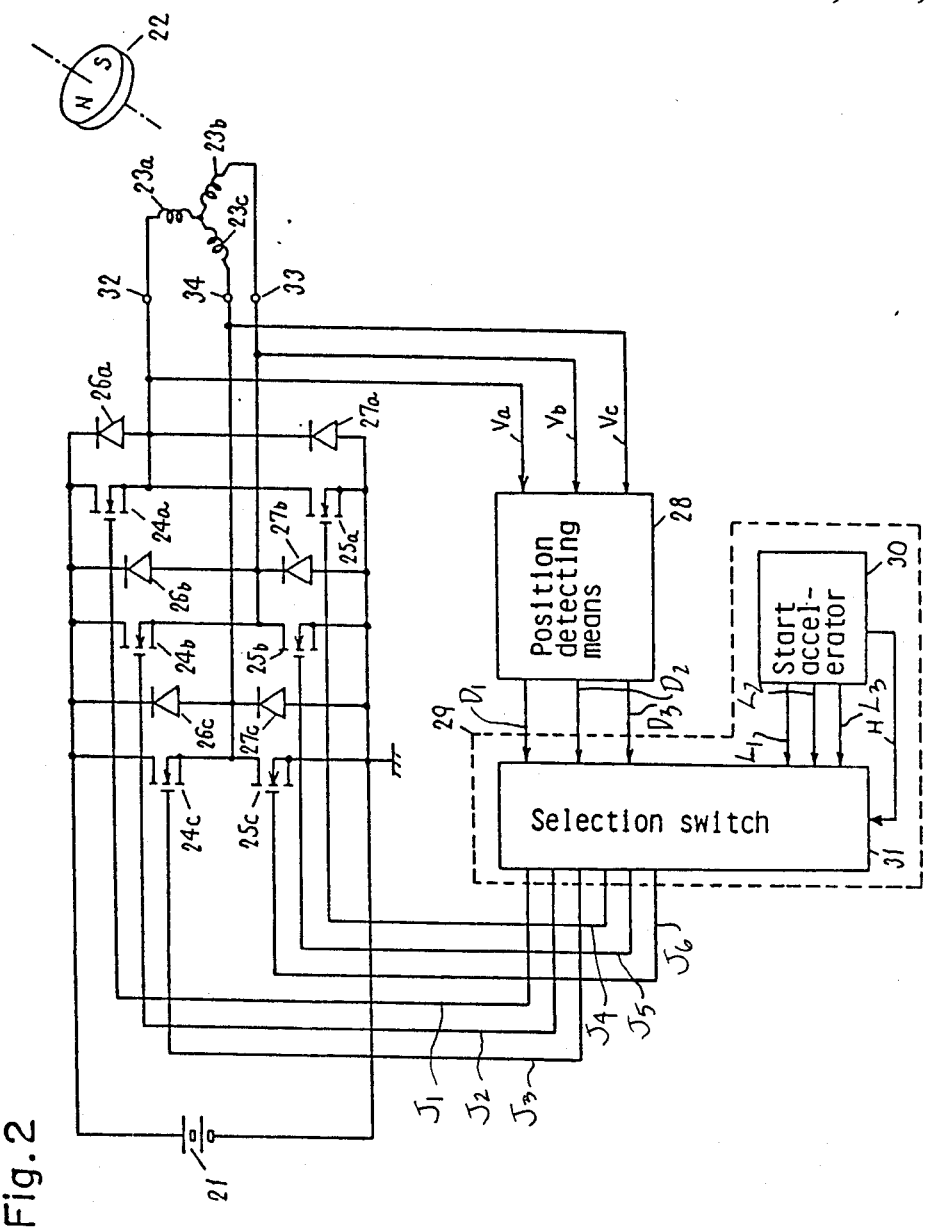
FIG. 2 is a block diagram showing a starting circuit of a brushless DC motor of the present invention.

A first embodiment of the present invention is shown in FIG. 2. Referring to FIG. 2, numeral 21 is a direct current power source, numeral 22 is a rotor, numerals 23a, 23b, 23c are three phase coils, numerals 24a, 24b, 24c are first driving transistors, numerals 25a, 25b, 25c are second driving transistors, numerals 26a, 26b, 26c are first diodes, numerals 27a, 27b, 27c are second diodes, numeral 28 is a position detecting means, numeral 29 is a switching-driving part, and is composed of a start accelerator 30 and a selection switch 31.

The rotor 22 having a magnetic pole pair of an N pole and S pole which is composed of a permanent magnet, makes a magnetic flux of the magnetic field interlink with three phase coils 23a, 23b, 23c. By mean of switching control of the current flowing states of the first driving transistors 24a, 24b, 24c which are composed of a vertical-type power MOS field effect transistors of N channel (FET), current paths from the direct current power source 21 to the three phase coils 23a, 23b, 23c are switched. In a similar manner, by switching control of the current flowing states of the second driving transistors 25a, 25b, 25c which are composed of the vertical-type power MOS field effect transistors of N channel (FET), the current paths from the three phase coils 23a, 23b, 23c to the direct current power source 21 are switched. The first diodes 26a, 26b, 26c are connected in reverse direction and in parallel across input terminals and output terminals of the first driving transistors 24a, 24b, 24c. The second diodes 27a, 27b, 27c are connected in reverse direction an in parallel across input terminals and output terminals for of the second driving transistors 25a, 25b, 25c. By switching and controlling signals to the control terminals of the first driving transistors 24a, 24b, 24c and the second driving transistors 25a, 25b, 25c, currents to the three phase coils 23a, 23b, 23c are supplied in a predetermined order. An electromagnetic force is generated by the magnetic flux of the magnetic field of the rotor 22 and the current to the three phase coils 23a, 23b, 23c and the rotor 22 is rotated in a predetermined direction.

An input-output terminal 32 (first terminal) for current to the coil 23a is connected to the junction point of the first driving transistor 24a and second driving transistor 25a. The first diode 26a is connected across the first terminal 32 and the positive pole of the direct current power source 21 so as to be parallel to the first driving transistor 24a. The second diode 27a is connected across the negative pole of the direct current power source 21 and the first terminal 32 so as to be parallel with the second driving transistor 25a. In a similar manner, an input-output terminal 33 (second terminal) for current to the coil 23b is connected to the junction of the first driving transistor 24b and the second driving transistor 25b; the first diode 26d is connected across the second terminal 33 and the positive pole of the direct current power source 21 so as to be parallel with the first driving transistor 24b; and second diode 27b is connected across the negative pole of the direct current power source 21 and the second terminal 33 so as to be parallel with the second driving transistor 25b. In a similar manner, an input-output terminal 34 (third terminal) for current to the coil 23c is connected across the first driving transistor 24c and the junction point of the second driving transistor 25c; the first diode 26c is connected across a C terminal; and the positive pole of the direct current power source 21 so as to be parallel with the first driving transistor 24c; and the second diode 27c is connected across the negative pole of the direct current power source 21; and the third terminal 34 so as to be parallel with the second driving transistor 25c.

Terminal voltages Va, Vb, Vc of the first terminal 32, the second terminal 33 and the third terminal 34, respectively are inputted into the position detecting means 28. By a counter electromotive force arising on the terminal voltage Va, Vb, Vc when the rotor 22 rotates in a rotating speed exceeding a predetermined speed, the position detecting means 28 detects the rotating position of the rotor 22, and outputs control signals D1, D2, D3 corresponding to the rotating position.

Figure 3:
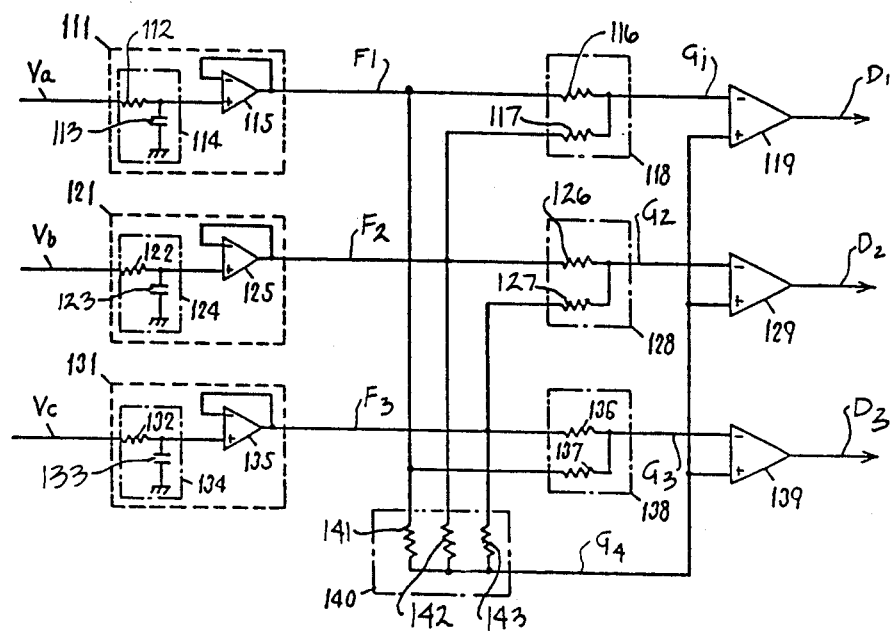
FIG. 3 is a circuit showing a concrete construction of a position detecting part of FIG. 2.

The above-mentioned position detecting means 28, as shown in FIG. 3, is composed of filters 111, 121, 131 wherein the respective terminal voltages Va, Vb, Vc are inputted to make smooth signals. Mixing means 118, 128, 138, 140 make mixed signals from the smoothed signals from the filters 111, 121, 131, and comparing means 119, 129, 139 compare signals from the above-mentioned mixing means 118, 128, 138, 140. A concrete constitution of the position detecting means 28 is elucidated by using FIG. 3, wherein the terminal voltage Va is inputted into the first filter 111. The first filter 111 is composed of a serial connection of an integrating circuit 114 and a buffer circuit 115, and has integration characteristic first order. The integrating circuit 114 is coposed of a resistor 112 and a capacitor 113. As a result, an output signal, wherein the terminal voltage Va is integrated and smoothed, is obtained. Moreover, the terminal voltage Vb is inputted into the second filter 121. The second filter 121 is composed of a series connection of a integrating circuit 124 and a buffer circuit 125, and is made to have integration characteristic of a first order. The integrating circuit 124 is composed of a resistor 122 and capacitor 123. Consequently, an output signal, wherein the terminal voltage Vb is integrated and is smoothed, is obtained. In a similar manner, the terminal voltage Vc is inputted into a third filter 131. The third filter 131 is composed of a serial connection of an integrating circuit 134 and buffer circuit 135, and is made to have integration characteristic of a first order. The integrating circuit 134 is composed of a resistor 132 and capacitor 133. Consequently, an output signal F3, wherein the terminal voltage Vc is integrated and is smoothed, is obtained.

A first mixing means 118 mixes the output signal F1 of the first filter 111 and the output signal F2 of the first filter 121, and a mixed signal G1 is obtained. When resistances of resistors 116 and 117 are R1 and R2, respectively, the mixed signal G1 is $$G1 = (R2 \cdot F1 + R1 \cdot F2)/(R1 + R2) \tag{1}$$

Now, provided that R1 and R2 are R1=20(KΩ), and R2=80(KΩ), $$G1 = 0.8 \cdot F1 + 0.2 \cdot F2 \tag{2}$$

In a similar manner, a second mixing means 128 mixes the output signal F2 of the second filter 121 and the output signal F3 of the third filter 131, and mixed signal G2 is obtained. Provided that resistances of resistors 126 and 127 are R1 and R2, respectively, the mixed signal G2 is $$G2 = (R2 \cdot F2 + R \cdot F3)/(R1 + R2) = 0.8 \cdot F2 + 0.2 \cdot F3 \tag{3}$$

In a similar manner, a third mixing means 138 mixes the output signal F3 of the third filter 131 and the output signal F1 of the first filter 111, and mixed signal G3 is obtained. When resistances of resistors 136 and 137 are made R1 and R2, respectively, mixed signal G3 is $$G3 = (R2 \cdot F3 + R1 \cdot F1)/(R1 + R2) = 0.8 \cdot F3 + 0.2 \cdot F1 \tag{4}$$

Furthermore, a fourth mixing means 140 mixes the output signal F1 of the first filter 111, the second output signal F2 of the second filter 121 and the output signal F3 of the third filter 131, a fourth mixed signal G4 is obtained. When resistances of resistors 141 and 142 are made to be R3=100(KΩ), the mixed signal G4 is $$G4 = (F1 + F2 + F3)/3 \tag{5}$$

The first comparing means 119 compares the output signal G1 of the first mixing means 118 and the output signal G4 of the fourth mixing means 140, and a digital signal D1 corresponding to a relation of larger or smaller thereof is obtained. Namely, in case of G1>G4, D1="L" (low potential), in case of G1<G4, D1="H" (high potential). In a similar manner, a second comparing means 129 compares the output signal G2 of the second mixing means 128 and the output signal G4 of the fourth mixing means 140, a digital signal D2 corresponding to a relation of larger or smaller thereof is obtained. Namely, in case of G2>G4, D2="L" (low potential), and in case of G2<G4, D2="H" (high potential). In a similar manner a third comparing means 139 compares the output signal G3 of the third mixing means 138 and the output signal G4 of the fourth mixing means 140, and a digital signal D3 corresponding to a relation of larger or smaller thereof is obtained. Namely, in case of G3>G4, D3="L" (low potential), and in case of G3<G4, D3="H" (high potential). The output signals D1, D2, D3 of the comparing means 119, 129, 139 are inputted into a switching-driving part 29 as a control signal of the position detecting means 28.

The switching-driving part 29 is composed of a start accelerator 30 and a selection switch 31. The start accelerator 30 outputs pulse signals L1, L2, L3 for starting and accelerating the rotor 22 from a stopped state until a rotation at a predetermined speed and a start command signal H. Furthermore, the selection switch 31 selects either the control signals D1, D2, D3 of the position detecting means 28 or pulse signals L1, L2, L3 of the start accelerator 30 on the basis of the start command signal H, and a switching signal of the first driving transistor and the second driving transistor is made by the selected signals.

Figure 4:
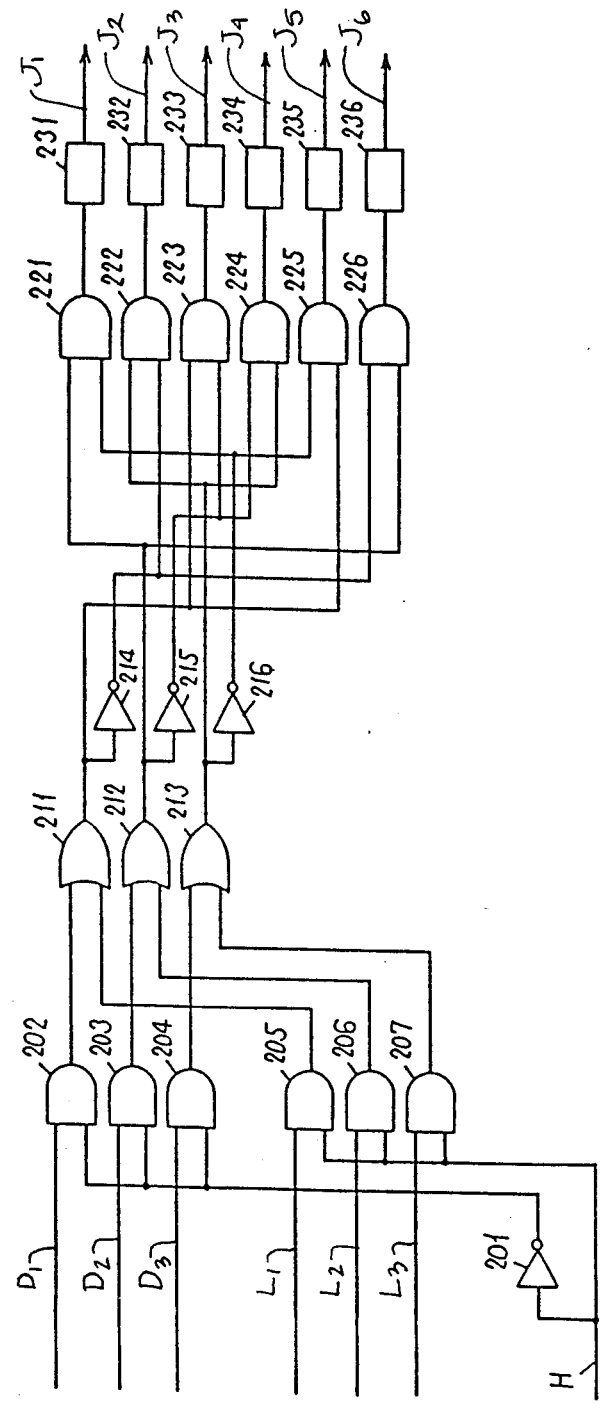
FIG. 4 is a circuit showing a construction of a selection switch of FIG. 2.

FIG. 4 shows a concrete example of the constitution of the selection switch 31. When the start command signal H is "L", signals D1, D2, D3 of the position detecting means 28 and the start command signal of the start accelerator 30 through an inverter circuit 201 are inputted into the AND circuits 202, 203, 204, and their outputs become. On the other hand, outputs of the AND circuit 205, 206, 207 become "L", and outputs of OR circuits 201, 212, 213 become the signals D1, D2, D3. Inverter circuits 214, 215, 216, AND circuits 221, 222, 223, 224, 225, 226 and amplififers 231, 232, 233, 234, 235, 236 issue six-phase output pulse signals J1, J2, J3, J4, J5, J6 on the basis of the outputs D1, D2, D3 of the OR circuits 211, 212, 213. Their logical equations are;

$$J1 = D2 \cdot NOT(D3) \tag{A}$$

$$J2 = D3 \cdot NOT(D1) \tag{B}$$

$$J3 = D1 \cdot NOT(D2) \tag{C}$$

$$J4 = NOT(D2) \cdot D3 \tag{D}$$

$$J5 = NOT(D3) \cdot D1 \tag{E}$$

$$J6 = NOT(D1) \cdot D2 \tag{F};$$

where, NOT(Q) shows contradiction of Q. The pulse signals J1, J2, J3, J4, J5, J6 are supplied as driving signals of the first driving transistors 24a, 24b, 24c and the second driving transistors 25a, 25b, 25c, respectively. Additionally the amplifiers 231, 232, 233, 234, 235, 236 are permitted to have isolation functions or potential converting functions.

In a similar manner, when the start command signal H is "H", the AND circuits 205, 206, 207 output pulse signals L1, L2, L3 of the start accelerator 30, and the outputs of the AND circuits 202, 203, 204 become "L", then the outputs of the OR circuits 211, 212, 213 become the signals L1, L2, L3. The inverter circuit 214, 215, 216, the AND circuits 221, 222, 223, 224, 225, 226 and the amplifiers 231, 232, 233, 234, 235, 236 output the six-phase pulse signals J1, J2, J3, J4, J5, J6 on the basis of the outputs L1, L2, L3 of the OR circuits 211, 212, 213. Their logical equations are, $$J1 = L2 \cdot NOT(L3) \tag{G}$$

$$J2 = L3 \cdot NOT(L1) \tag{H}$$

$$J3 = L1 \cdot NOT(L2) \tag{I}$$

$$J4 = NOT(L2) \cdot L3 \tag{J}$$

$$J5 = NOT(L3) \cdot L1 \tag{K}$$

$$J6 = NOT(L1) \cdot L2 \tag{L}$$

Next, the whole rotation and driving operations are elucidated.

Figure 5:
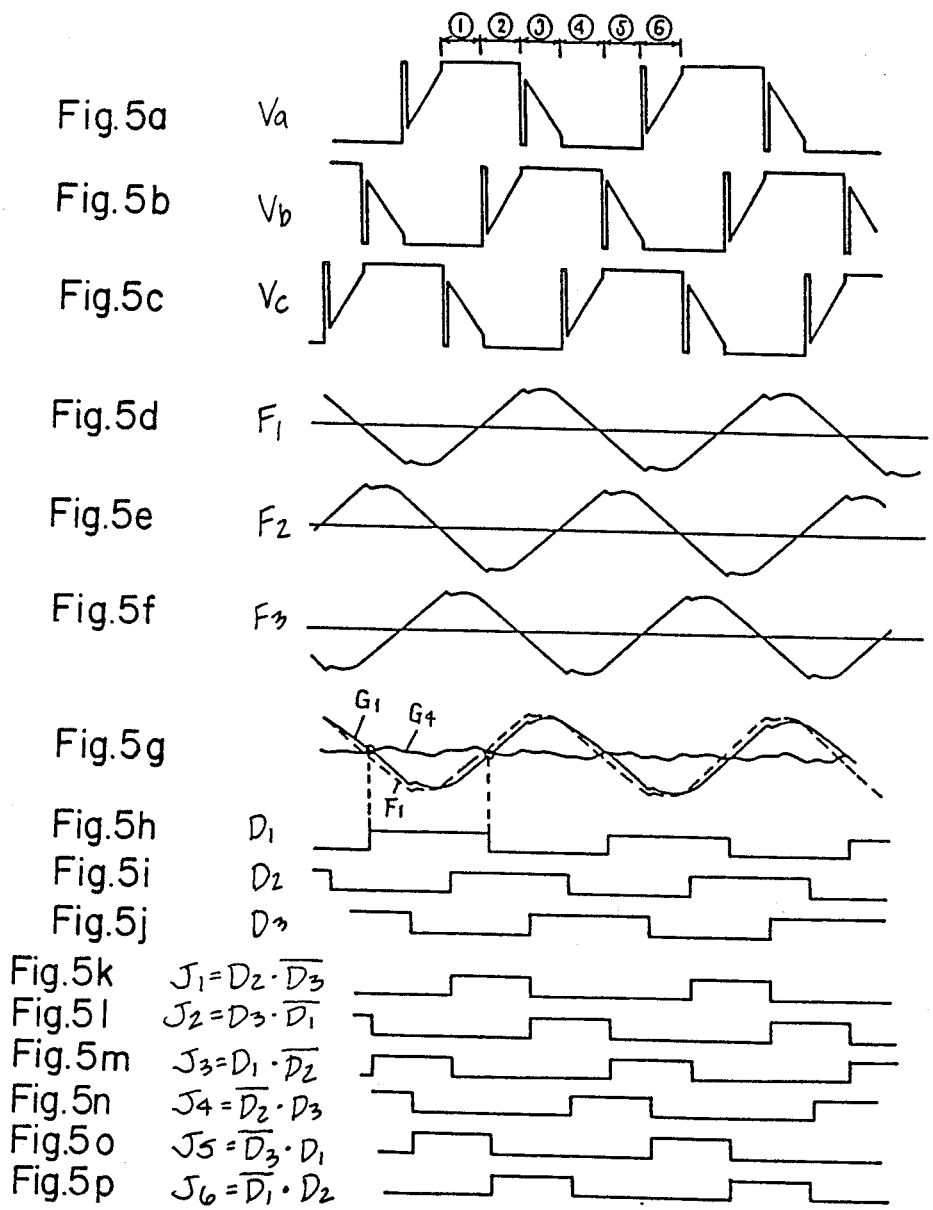
FIG. 5a–FIG. 5p are figures of waveforms for elucidating operation of the starting circuit of FIG. 2.

First, in the case that the rotor 22 is rotating with a rotating speed exceeding a predetermined speed, the operation is elucidated referring the waveforms for elucidation of operation of FIG. 5. FIG. 5(a), (b), (c), are waveforms of the terminal voltages of the first terminal 32, the second terminal 33, the third terminal 34 in FIG. 2, and currents are supplied to the coils (two phases) of a predetermined phase corresponding to the current flowing states of the first driving transistors and the second driving transistors. Referring to FIG. 5, State ①: Only the driving transistors 24a and 25b become conduction state, and a current is supplied to the coils 23a and 23b (the current flows from the first terminal 32 to the second terminal 33).

State ②): Only the driving transistors 24a and 25c become conducting state, and the current is supplied to the coils 23b and 23c (the current flows from the second terminal 33 to the third terminal 34).

State ③: Only the driving transistors 24b and 25c become conducting, and the current is supplied to the coils 23b and 23c (the current flows from the first terminal 32 to the third terminal 34).

State ④: Only the driving transistors 24b and 25a become conducting, and the current is supplied to the coils 23b and 23a (the current flows from the second terminal 33 to the first terminal 32).

State ⑤: Only the driving transistors 24c and 25a become conducting, and the current is supplied to the coils 23c and 23a (the current flows from the third terminal 34 to the first terminal 32).

State ⑥: Only the driving transistors 24c and 25b become conducting state, and the current is supplied to the coils 23c and 23b (the current flows from the third terminal 34 to the second terminal 33).

The current path is changed in turn from the state ① to the state ⑥ by rotation of the one magnet pole pair of the rotor 22. Consequently, the three phase current is supplied to the three phase coils 23a, 23b, 23c in the order of the first terminal 32, the second terminal 33, the third terminal 34. Moreover, when the state changes, spike voltages are generated on the respective terminals, a magnetic energy which is stored in the coils is returned to the direct current power source 21 through the first diodes 26a, 26, 26c or the second diodes 27a, 27b, 27c.

As shown in FIG. 3 the terminal voltages Va, Vb, Vc are smoothed by the first filter 111, the second filter 121, or the third filter 131 of the position detecting means 28, and the smooth three phase signals F1, F2, F3 as shown in FIG. 5(d), (e), (f) are obtained. The output signal F1 of the first filter 111 and the output signal F2 of the second filter 121 are mixed in the first mixing means 118 (equation (2)), the output signal F1 of the first filter 111, the output signal F2 of the second filter 121 and the output signal F3 of the third filter 131 are mixed in the fourth mixing means 140 (equation (5)), and the mixed signal G1 and the mixed signal G4 are compared in the first comparing means 119. Waveforms of the mixed signals G1 and G4 are shown in FIG. 5(g), and the output signal D1 of the first comparing means 119 is shown in FIG. 4(h). In a similar manner, the output signal G2 of the second mixing means 128 and the output signal G4 of the fourth mixing means 140 are compared in the second comparing means 129, and the output signal D2 as shown in FIG. 5(i) is obtained. In a similar manner, the output signal G3 of the third mixing means 138 and the output signal G4 of the fourth mixing means 140 are compared in the third comparing means 139, and the output signal D3 as shown in FIG. 5(j) is obtained. The output signals D1, D2, D3 of the first, the second and the third comparing means 119, 129, 139 become three phase digital signals, and are inputted in the switching-driving part 29 as a control signal.

Because the rotor 22 rotates with a rotating speed exceeding a predetermined speed, the start command signal H of the start accelerator 30 of the switching-driving part 29 is "L". Therefore, selection switch 31 generates signals J1, J2, J3, J4, J5, J6 of equation (A)— equation (F) on the basis of the control signals D1, D2, D3 of the position detecting means 28. The waveforms shown in (k), (l), (m), (n), (o), (p) of FIG. 5, J1–J6, are six phase pulse signals. The signals J1, J2, J3 of the switching-driving part 29 are supplied as switching signals of the first driving transistors 24a, 24b, 24c, respectively, and the signals J4, J5, J6 are supplied as switching signals of the second driving transistor 25a, 25b, 25c, respectively.

Therefore,
State ①: Only J1 and J5 are "H"
State ②: Only J1 and J6 are "H"
State ③: Only J2 and J6 are "H"
State ④: Only J2 and J4 are "H"
State ⑤: Only J3 and J4 are "H"
State ⑥: Only J3 and J5 are "H",
and the first driving transistors 24a, 24b, 24c and the second driving transistors 25a, 25b, 25c accomplish switching operation of current path of the above-mentioned from state ① to state ⑥ (referring to FIG. 5). As a result, the rotor 22 is continuously rotated in a predetermined direction.

Next, operation wherein the rotor 22 is started and accelerated is elucidated. The start accelerator 30 of the switching-driving part 29 sends the starting command signal H to "H", and low frequency three phase pulse signals L1, L2, L3 are output. The selection switch 31 outputs the six-phase pulse signals J1–J6 in accordance with the equations (G)–(L) on the basis of the pulse signals L1, L2, L3, and switches in turn the first driving transistors 24a, 24b, 24c and the second driving transistors 25a, 25b, 25c to the above-mentioned state 1–state 6. As a result, the rotor 22 is started and accelerated as a stepping motor or low frequency synchronous motor. Moreover, by a gradual rise of the frequencies of the pulse signals L1, L2, L3 of the start accelerator 30, the rotor 22 is accelerated to a predetermined rotating speed. When the rotor is accelerated to the predetermined rotating speed, the start command signal H of the start accelerator 30 changes to "L", and the switching signals J1–J6 of the first driving transistors and the second driving transistors are made by the control signals D1, D2, D3 of the position detecting means 28: It is possible that the start accelerator 30 detects the rotating speed of the rotor 22, and the start command signal H is caused to change to "L" when the rotating speed exceeds a predetermined speed.

As shown in the embodiment, by detecting a counter-electromotive voltage which is generated in the coils 23a, 23b, 23c from the terminal voltages Va, Vb, Vc of the first terminal 32, the second terminal 33 and the third terminal 34, respectively and by switching the current flowing states of the first driving transistor and the second driving transistor responding to the detected voltages, favorable switching operation of the current path can be realized without use of a special position detecting element. A precise position detecting operation can be carried out by a simple construction, especially when the position detecting means 28 is composed of the first filter 111 having a substantial first order integral characteristic for smoothing the terminal voltage of the first terminal 32, the second filter 121 having a substantial integration characteristic of a first order for smoothing the terminal voltage of the second terminal 33, the third filter 131 having a substantial integration characteristic of a first order for smoothing the terminal voltage of the third terminal 34, the first mixing means 118 for mixing the output signal of the first filter 111 and the output signal of the second filter 121, the second mixing means 128 for mixing the output signal of the second filter 121 and the output signal of the third filter 131, the third mixing means 138 for mixing the output signal of the third filter 131 and the output signal of the first filter 111, the fourth mixing means 140 for mixing the output signal of the first filter 111 and the output signal of the second filter 121 and the output signal of the third filter 131, the first comparing means 119 for making the first digital signal by comparing substantially all the output signal of the first mixing means 118 and the output signal of the fourth mixing means 140, the second comparing means 129 for making the second digital signal by comparing the output signal of the second mixing means 128 and the output signal of the fourth mixing means 140, and the third comparing means 139 for making the third digital signal by comparing substantially all the output signal of the third mixing means 138 and the output signal of the fourth mixing means 140.

Details as to this is further elucidated. The rotating speed of the brushless DC motor of the preferred embodiment is controlled at variable speeds. In such case, maximum values of the terminal voltages Va, Vb, Vc vary when the rotating speed of the motor is varied, variations of the direct current potential arise in the output signals F1, F2, F3 of the filters. Therefore, for example, in case that the current path is switched by comparing the signals F1, F2, F3 with the reference direct current voltage, varying points of the output signals D1, D2, D3 of the comparing means are significantly displaced from ideal switch positions of the current path (the switching positions where the maximum acceleration torque is obtainable). As a result, the rotation driving operation of the motor is disturbed, and a normal rotation can not be realized.

In a construction of the embodiment in order to counteract a problem like this, even if the voltage of the direct current power source 21 is varied, the direct current potentials of the output signals F1, F2, F3 of the filters 111, 121, 131 vary in a similar manner. Accompanying that, the direct current potentials of the output signals G1, G2, G3, G4 of the mixing means 118, 128, 138, 140 also vary in a similar manner. Therefore, the output signals D1, D2, D3 of the comparing means 119, 129, 139 become irrelevant to variation of the voltage of the direct current power source 21, and precise position detecting signals D1, D2, D3 are obtainable.

Furthermore, the brushless DC motor of the embodiment has the following advantage. As shown in FIG. 5(a), (b), (c), a sharp spike voltage is generated in the terminal voltages Va, Vb, Vc at the time of the switching of the current path. Phases of the output signals F1, F2, F3 of the filters 111, 121, 131 shift to a forward direction (to the counter-electromotive voltage). Therefore, for instance, in case that the current path is changed at zero-crossing points (points of reference direct current voltage value) of the signals F1, F2, F3, whole switching timings advance. Especialy, when a load torque has increased, advance of the positional detection increases, and a fatal problem that breakdown or stop page of the motor has been caused. It has been found that the problem was caused by the following operating mechanism. Namely, when the load torque increases, the current increases accompanying therewith, and also a magnetic energy which is stored in the coil increases, and width of the spike voltage at the point of time of switching the current path becomes wide. When the width of the spike voltage becomes wide, phases of the output signals F1, F2, F3 of the filters advance, and phases of the zero-crossing points of the F1, F2, F3 advance. Since the current path is switched at the zero-crossing point of the signals F1, F2, F3, the switching time point of the current path also advance, and a voltage drop due to current arising in the terminal voltages Va, Vb, Vc or spike voltage advance occurs. Namely, it was found that a positive feedback loop of the advance of the terminal voltages Va, Vb, Vc of the coil (voltage drop by current and spike voltage), the advance of the output signals F1, F2, F3 of the filters, the advance of the control signals D1, D2, D3 of the position detecting means 28, the advance of the switching signals J1-J6 of the switching-driving part 29, the advance of switching of the current path and the advance of Va, Vb, Vc is formed, and that, when the load torque is large, the influence of the above-mentioned positive feedback loop becomes larger, and the position detecting operation or rotation driving operation becomes unstable, and the motor breaks down.

As to such problem, in the preferred embodiment an advancing rate of the phase by the spike voltage is preliminary compensated for by means of proper selection of a mixing rate of the first mixing means 118, the second mixing means 128 and the third mixing means 138. For example, the first output signal G1 of the first mixing means 118 includes the output signal F1 of the first filter 111 and the output signal F2 of the second filter 121 at the mixing rate of 8:2. As a result, as shown in FIG. 5(g) and (h), the output signal G1 of the first mixing means 118 lags by about 15 degrees from the output signal F1 of the first filter 111 (provided that one periodic time of the signal F1 is 360 degrees), and the changing point of the first digital signal D1 is also delayed (with respect to the counter-electromotive voltage).

In a similar manner, the output signal G2 of the second mixing means 128 becomes a signal which lags by about 15 degrees from the output signal F2 of the second filter 121, and a changing point of the second digital signal D2 is also delayed. In a similar manner, the output signal G3 of the third mixing means 138 becomes a signal which lags by 15 degrees from the output signal F3 of the third filter 131, and a changing point of the third digital signal D3 is also delayed. Since the switching signals J1-J6 are also delayed when the signals D1, D2, D3 are delayed, the advance rate of phase by the spike voltage is compensated, and the switching phase of the current path becomes almost equal to an ideal switching phase.

Thus, in the preferred embodiment, by a suitable selection of a mixing rate in the first mixing means 118 and second mixing means 128 and third mixing means 138, the mixed signals G1, G2, G3 can be easily delayed by a predetermined phase (from 5 degrees to 25 degrees) from that of the output signals F1, F2, F3 of the filters 111, 121, 131, and the switching phase of the current path becomes almost equal to the ideal switching phase.

In the above-mentioned embodiment, though the first diodes 26a, 26b, 26c are coupled to the first driving transistors 24a, 24b, 24c in parallel, the second diodes 27a, 27b, 27c are coupled to the second driving transistors 25a, 25b, 25c in parallel, these first diodes and the second diodes can be substituted by parasitic diodes existing between the drain and source of the vertical-type power MOS field effect transistor of N channel. Of course, such a case is included in the present invention. One or both of the first driving transistors and/or the second driving may be replaced by bi-polar transistors.

Furthermore, the start accelerator 30 of the switching-driving part 29 or logic of the selection switch 31 in the above-mentioned embodiment may be realized by a micro-computer, and of course this is included in the present invention. Moreover, though the three phase coil is connected in a star-shape in the above-mentioned embodiment, it may be connected in a shape.

Furthermore, it may be constituted that variable speed control of the rotation speed of the motor is realized by means of high frequency switching operation of either one or both of the first driving transistor and the second driving transistor by a pulse width modulation signal. Various modifications which do not change purpose of the present invention are available.

Figure 6:
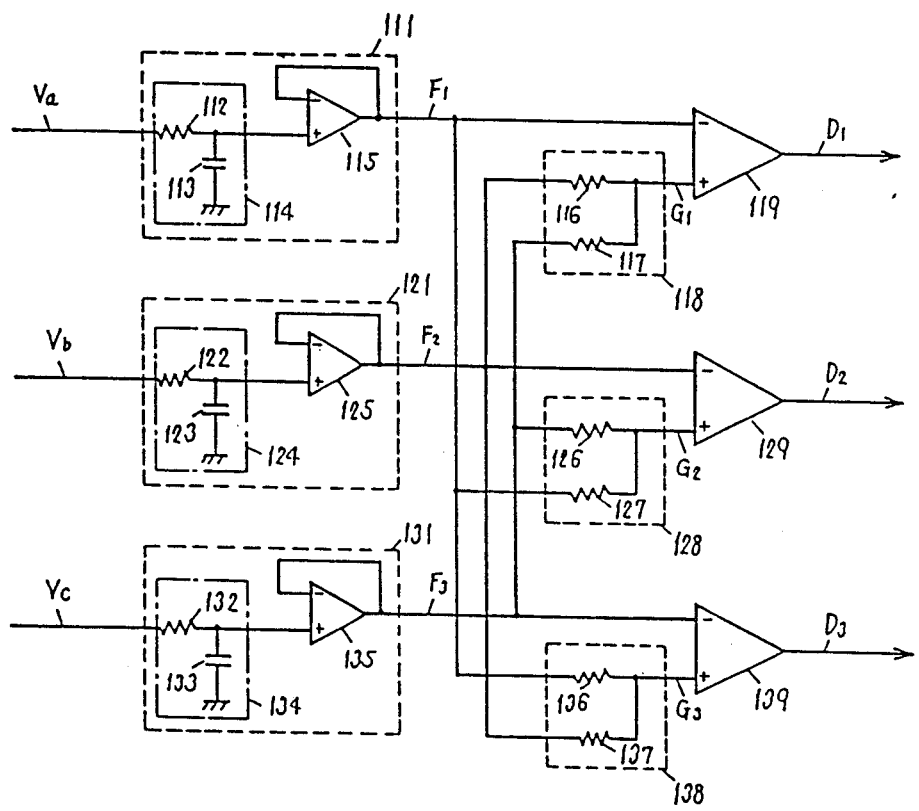
FIG. 6 is a block diagram showing another embodiment of the position detecting part.
Figure 7:
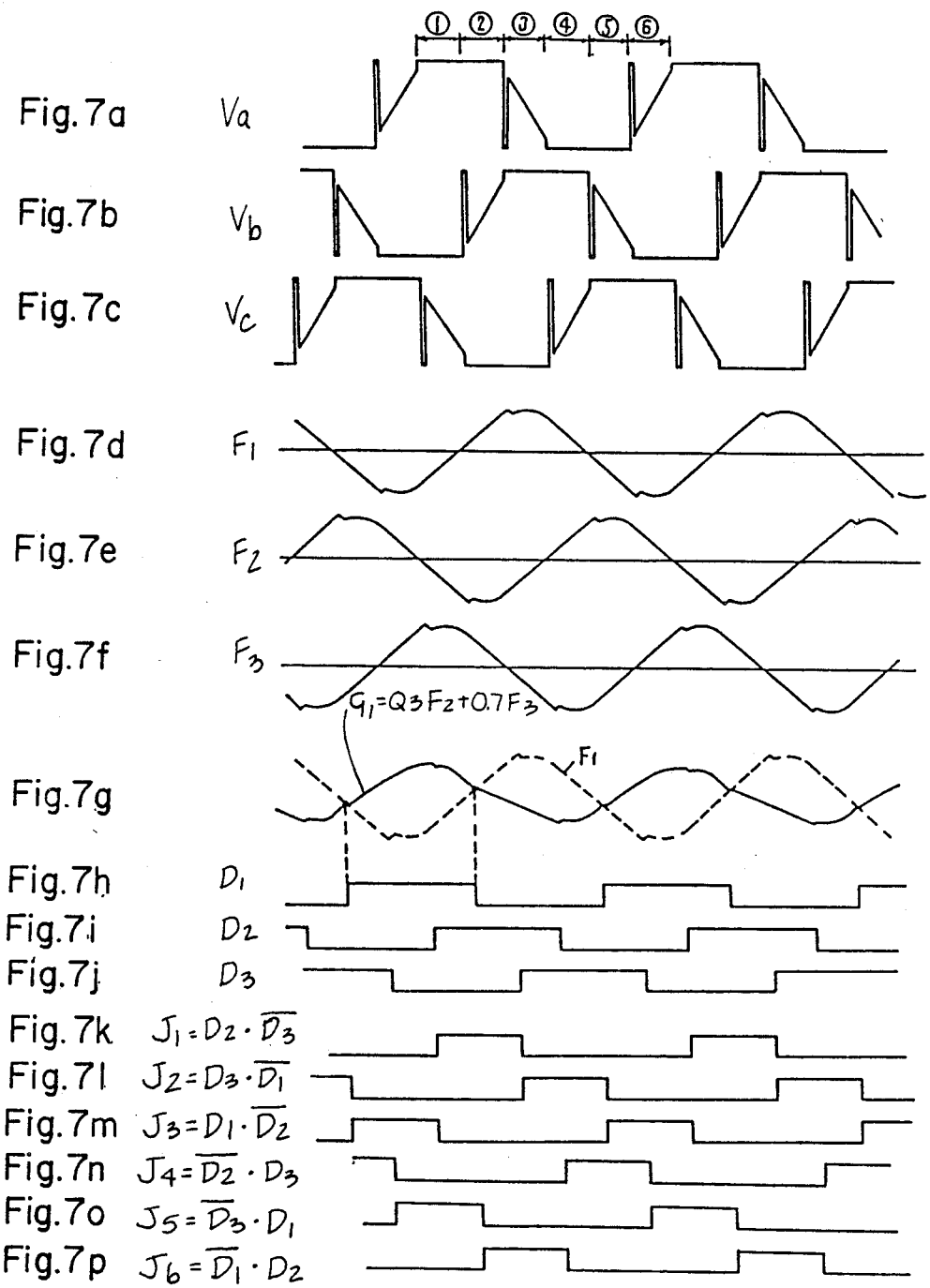
FIG. 7a–FIG. 7p are figures of waveforms for elucidating operation of the position detecting part of FIG. 6.

Next, another embodiment of the position detecting means 28 is elucidated by reference to FIG. 6 and FIG. 7.

The first mixing means 118 mixes the output signal F2 of the second filter 121 and the output signal F3 of the third filter 131, and the mixed signal G1 is obtained. When the resistances of the resistors 116 and 117 are R1 and R2, respectively, the mixed signal G1 is $$G1 = (R2 \cdot F2 + R1 \cdot F3)/(R1 + R2) \qquad (6)$$

In the case of R2=30 (KΩ), R1=70 (KΩ), $$G1 = 0.3 \cdot F2 + 0.7 \cdot F3 \qquad (7).$$

In a similar manner, the second mixing means 128 mixes the output signal F3 of the third filter 131 and the output signal F1 of the first filter 111, and the mixed signal G2 is obtained. When the resistances of the resistors 126 and 127 are R1 and R2, respectively, the mixed signals G2 is $$G2 = (R2 \cdot F3 + R1 \cdot F1)/(R1 + R2) = 0.3 \cdot F3 + 0.7 \cdot F1 \quad (8).$$

In a similar manner, the third mixing means 138 mixes the output signal F1 of the first filter 111 and the output signal F2 of the second filter 121, and the mixed signal G3 is obtained. When the resistances of the resistors 136 and 137 are R1 and R2, respectively, the mixed signal G3 is $$G3 = (R2 \cdot F1 + R1 \cdot F2)/(R1 + R2) = 0.3 \cdot F1 + 0.7 \cdot F2 \quad (9).$$

The first comparing means 119 compares the output signal F1 of the first filter 111 with the output signal G1 of the first mixing means 118, and the digital signal D1 corresponding to relation of which is the larger or smaller signals thereof is obtained. Namely, in case of F1>G1, it becomes D1="L" (low potential); and in case of F1<G1, it becomes D1="H" (high potential). In a similar manner, the second comparing means 129 compares the output signal F2 of the second filter 121 and the output signal G2 of the second mixing means 128, and the digital signal D2 corresponding to relation of which is the larger or smaller signal thereof is obtained. Namely in case of F2>G2, it becomes D2="L" (low potential; and in case of F2<G2, it becomes D2="H" (high potential). In a similar manner, the third comparing means 139 compares the output signal F3 of the third filter 131 with the output signal G3 of the third mixing means 138, and the digital signal D3 corresponding to relation of which is the larger or smaller signal thereof is obtained. Namely in case of F3>G3, it becomes D3="L" (low potential); and in case of F3<G3, it becomes D3="H" (high potential). The output signals D1, D2, D3 of the comparing means 119, 129, 139 are inputted in the switching-driving part 29 as a control signal of the position detecting means 28.

In the above-mentioned construction, the terminal voltages Va, Vb, Vc are smoothed by the first filter 111, the second filter 121 and the third filter 131 of the position detecting means 28, and smooth three phase signals F1, F2, F3 as shown in FIG. 7(d), (e), (f) are obtained. The output signal F2 of the second filter 121 and the output signal F3 of the third filter 131 are mixed in the first mixing means 118 (equation (7)), and the mixed signal G1 and the output signal F1 of the first filter 111 are compared in the first comparing means 118. The waveforms of the signal G1 (solid line) and F1 (dotted line) are shown in FIG. 7(g), and the output signal D1 of the first comparing means 119 is shown in FIG. 7(h). In a similar manner, the output signal G2 of the second mixing means 128 and the output signal F2 of the second filter 121 are compared in the second comparing means 129, and the output signal D2 as shown in FIG. 7(i) is obtained. In a similar manner, the output signal G3 of the third mixing means 138 and the output signal F3 of the third filter 131 are compared in the third comparing means 139, and the output signal D3 as shown in FIG. 7(j) is obtained. The output signals D1, D2 and D3 of the first, the second and the third comparing means 119, 129 and 139 become three phase digital signals, and are inputted in the switching-driving part 29 as a control signal.

Since the rotor 22 is rotating above a predetermined speed, the start command signal H of the start accelerator 30 of the switching-driving part 29 is in "L". Therefore, the selection switch 31 generates the signals J1, J2, J3, J4, J5, J6 of the equation (A)—equation (F) on the basis of the control signals D1, D2, D3 of the position detecting means 28. As the waveforms show in FIGS. 7(k), (l), (m), (n), (o), (p), J1–J6 are six phase pulse signals. The signals J1, J2, J3 of the switching-driving part 29 are supplied as a switching signals of the first driving transistors 24a, 24b, 24c, respectively, and the signals J4, J5, J6 are supplied as the switching signal of the second driving transistors 25a, 25b, 25c, respectively. Therefore, State ①: Only J1 and J5 are "H"
State ②: Only J1 and J6 are "H"
State ③: Only J2 and J6 are "H"
State ④: Only J2 and J4 are "H"
State ⑤: Only J3 and J4 are "H"
State ⑥: Only J3 and J5 are "H";

and the first driving transistors 24a, 24b, 24c and the second driving transistors 25a, 25b, 25c accomplish switching operation of the current path from the above-mentioned state ① to state ⑥ (see FIG. 7). As a result, the rotor 22 is continuously rotated and driven in predetermined direction.

Next, the operation wherein the rotor 22 is started and accelerated from a stopped state is elucidated. The start accelerator 30 of the switching-driving part 29 turns the start command signal H to "H", and low frequency three phase pulse signals L1, L2, L3 are output. The selection switch 31 outputs six phase pulse signals J1–J6 in accordance with the equation (G)–equation (L) on the basis of the pulse signals L1, L2, and L3. The first driving transistors 24a, 24b, 24c and the second driving transistors 25a, 25b, 25c are switched to the above-mentioned state 1–state 6 in turn. Consequently, the rotor 22 is started and accelerated like a pulse motor or low frequency synchronous motor. Moreover, the rotor 22 is accelerated until it reaches a predetermined rotating speed by progressive increase of the frequency of the pulse signals L1, L2, L3 of the start accelerator 30. After the rotor 22 is accelerated to the predetermined rotating speed, the start command signal H of the start accelerator 30 turns to "H", and the switching signals J1–J6 of the first driving transistor and the second driving transistor are produced by the control signals D1, D2, D3 of the position detecting means 28 (It is possible that the start accelerator 30 detects a rotating speed of the rotor 22, and makes the start command signal H to "L" at a predetermined speed).

Moreover, a value of phase advance by spike voltage can be compensated for by selection of a suitable mixing ratio of the mixing means. Namely, when the mixing ratio of the output signal F2 of the second filter 121 and the output signal F3 of the third filter 131 in the output signal G1 of the first mixing means 118 is Q1:W1, they are rendered to Q1<W1, and when the mixing ratio of the output signal F3 of the third filter 131 and the output signal F1 of the first filter 111 in the output signal G2 of the second mixing means 128 is Q2:W2 they are rendered to Q2<W2, and when the mixing ratio of the output signal F1 of the first filter 111 and the output signal F2 of the second filter 121 in the output signal G3 of the third mixing means 138 is Q3:W3 they are rendered Q3<W3; and thereby a phase of the switching timing of the current path can be easily delayed. In the preferred embodiment, the ratios Q1:W1=3:7, Q2:W2=3:7, Q3:W3=3:7 are set.

Next a second embodiment of the present invention is elucidated referring from FIG. 8 to FIG. 12.

Figure 8:
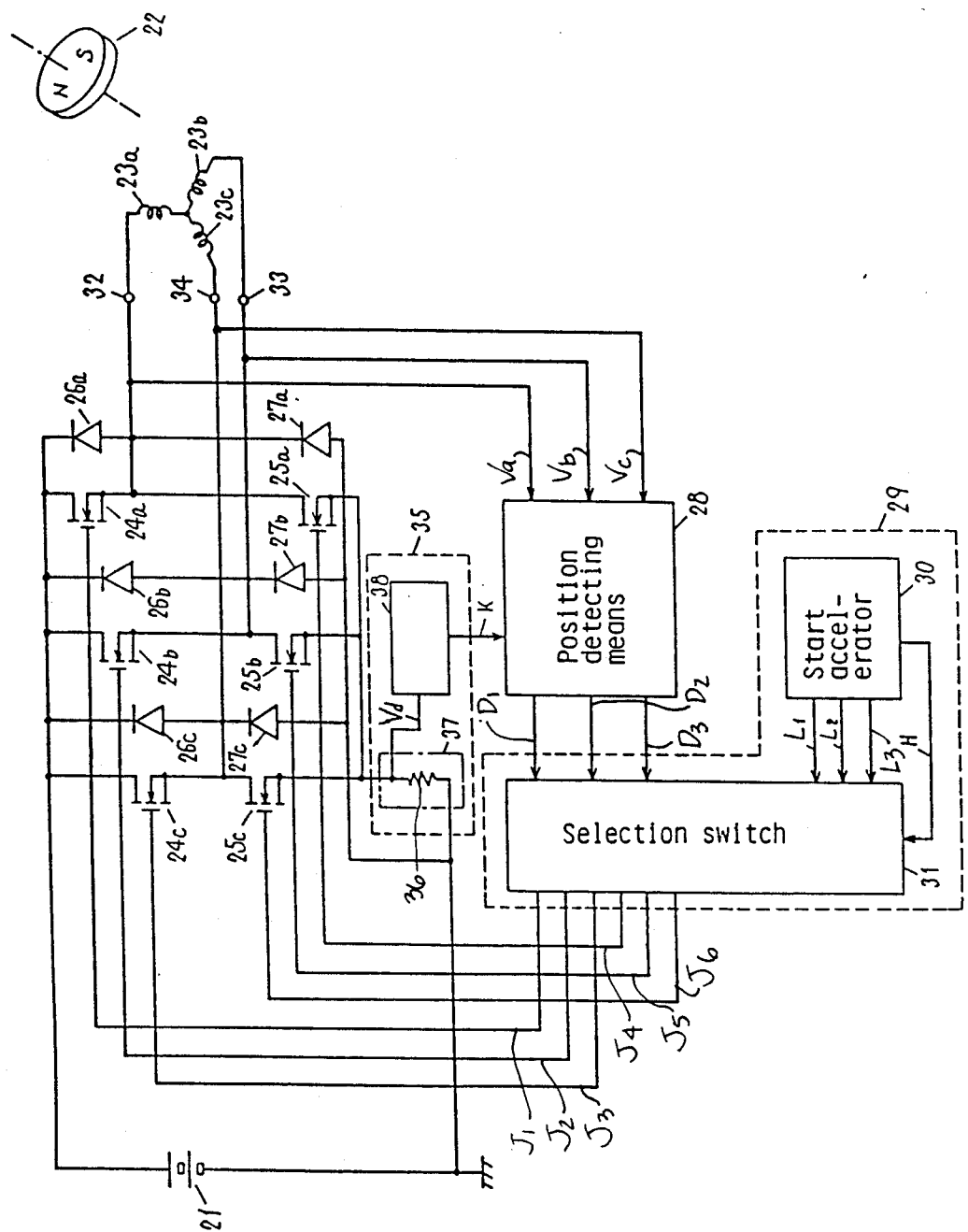
FIG. 8 is a block diagram showing the starting circuit of the second embodiment of the present invention.
Figure 9:
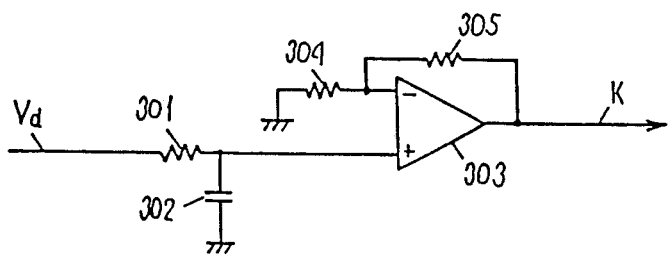
FIG. 9 is a figure showing a construction of a detected signal amplifier of FIG. 8.

Referring to FIG. 8, 35 is a current detecting part and detects a supply current to the three phase coils 23a, 23b, 23c. The current detecting part 35 is composed of a current detector 37 comprising a resistor 36 (about 0.05Ω) for detecting small currents and a detecting signal amplifier 38 for amplifying the detected signal Vd as shown in FIG. 9. A resistor 36 of the current detector 37 is inserted across a common junction terminal of the second driving transistors 25a, 25b, 25c and the direct current power source 21, and a detecting signal Vd of the voltage drop corresponding to supplying currents to the coils 23a, 23b, 23c is obtained. The detected signal Vd is input into the detecting signal amplifier 38. A concrete example of the construction of the detecting signal amplifier 38 is shown in FIG. 9. The high frequency ripple component of the detected signal Vd is smoothed and eliminated by a low pass filter of a resistor 301 and capacitor 302, and is amplified with non-inverse by a operational amplifier 303 and resistors 304, 305. Consequently, an amplified signal K of the detected signal Vd is issued.

Figure 10:
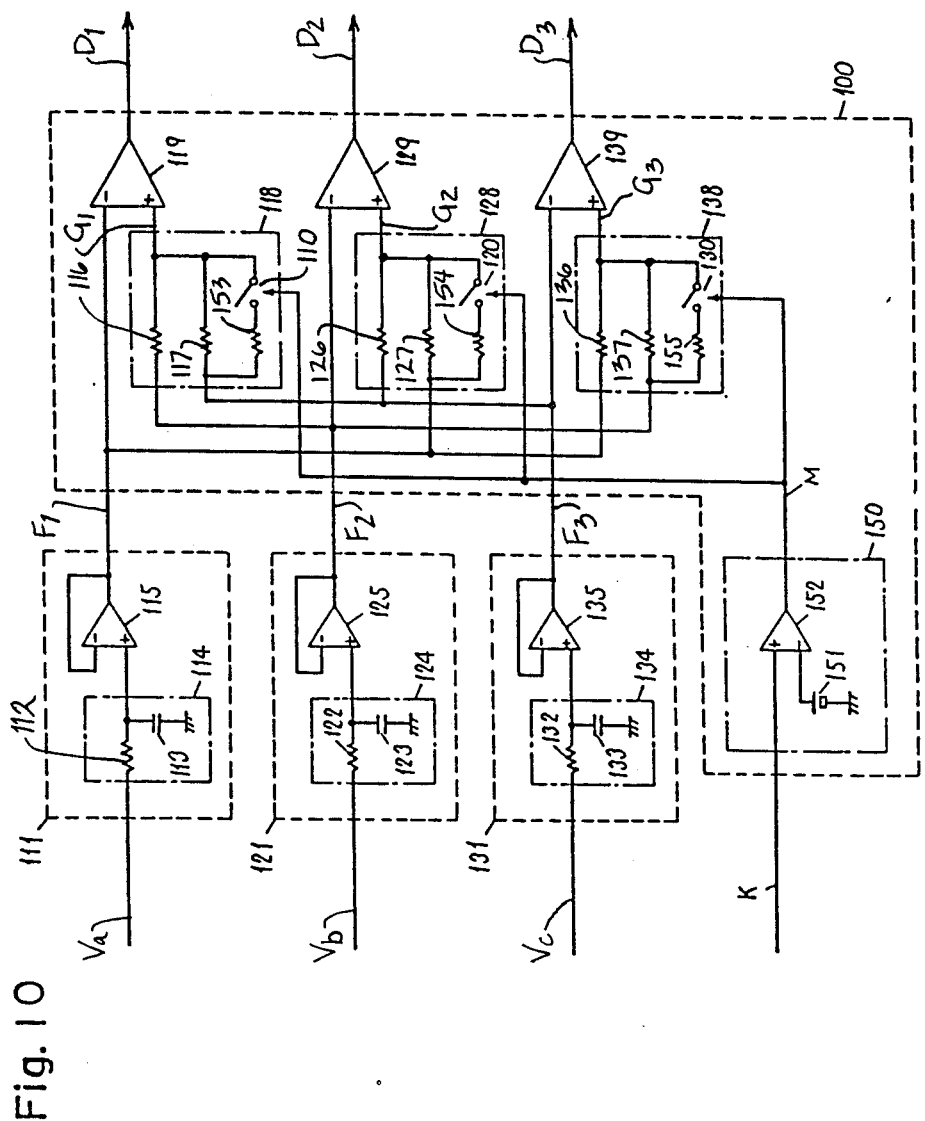
FIG. 10 is a figure showing a construction of the position detecting part of FIG. 8.

FIG. 10 shows a concrete example of the position detecting means 28 in the constitution of FIG. 8.

Numeral 100 designates a control signal generating means, and is composed of the first mixing means 118, second mixing means 128, third mixing means 138, first comparing means 119 and second comparing means 129, third comparing means 139 and a mixing ratio variable device 150. In the above-mentioned construction when the output signal K of the current detecting part 35 is smaller than a predetermined voltage of the reference voltage source 151 of the mixing ratio variable device 150, an output signal M of a comparator 152 of the mixing ratio variable device 150 is "L" (low potential). When the output signal K of the current detecting part 35 becomes larger than the predetermined voltage of the reference voltage source 151 the output signal M of the comparator 152 of the mixing ratio variable device 150 turns to "H" (high potential).

The first mixing means 119 mixes the output signal F2 of the signal filter 121 and the output signal F3 of the third filter 131 to obtain and the mixed signal G1. When the output signal M of the mixing ratio variable device 150 is "L", an analog switch 110 is open. At this time, the mixed signal G1 is decided by the resistors 116 and 117. When the resistances of the resistors 116 and 117 are R1, R2, respectively, the mixed signal G1 is $$G1=(R2 \cdot F2+R1 \cdot F3)/(R1+R2) \quad (10).$$

If R2=40 (KΩ), R1=60 (KΩ), it becomes:

$$G1=0.4 \cdot F2+0.6 \cdot F3 \quad (11).$$

When the output signal M of the mixing ratio variable device 150 is "H", the analog switch 110 closes. If the mixed signal in at this time is G1', then G1' is determined by the resistors 116 and 117 and 153. If the resistance of the resistor 153 is R3, and $$R2'=R2 \cdot R3/(R2+R3) \quad (12),$$

the G1' becomes:

$$G1'=(R2' \cdot F2+R1 \cdot F3)/(R1+R2') \quad (13).$$

If R3=10 (KΩ), R2' becomes R2'=8 (KΩ), and $$G1=0.118 \cdot F2+0.882 \cdot F3 \quad (14).$$

In a similar manner, the second mixing means 128 mixes the output signal F3 of the third filter 131 and the output signal F1 of the first filter 111, and a mixed signal G2 is obtained. When the output signal M of the mixing ratio variable device 150 is "L", the analog switch 120 is open. At this time, the mixed signal G2 is determined by the resistors 126 and 127. Provided that the resistances of the resistors 126 and 127 are R1 and R2, respectively, the mixed signal G2 becomes:

$$G2=(R2 \cdot F3+R1 \cdot F1)/(R1+R2)=0.4 \cdot F3+0.6 \cdot F1 \quad (15).$$

When the output signal M of the mixing ratio variable device 150 is "H", the analog switch 120 closes. The mixed signal G2' at this time is decided by the resistors 126 and 127. If the resistance of the resistor 154 is R3, $$G2'=(R2' \cdot F3+R1 \cdot F1)/(R1+R2')=0.118 \cdot F3+0.882 \cdot F1 \quad (16).$$

In a similar manner, the third mixing means 138 mixes the output signal F1 of the first filter 111 and the output signal F2 of the second filter 121, and the mixed signal G3 is obtained. When the output signal M of the mixing ratio variable device 150 is "L", the analog switch 130 is open. At this time, the mixed signal G3 is determined by the resistors 136 and 137. When the resistances of the resistors 136 and 137 are R1 and R2, respectively, the mixed signal G3 is $$G3=(R2 \cdot F1+R1 \cdot F2)/(R1+R2)=0.4 \cdot F1+0.6 \cdot F2 \quad (17).$$

When the output signal M of the mixing ratio variable device 150 is "H", the analog switch 130 closes. At this time the mixed signal G3' is decided by the resistors 136 and 137 and 155. If the resistance of the resistor 155 is shown by R3, $$G3'=(R2' \cdot F1+R1 \cdot F2)/(R1+R2')=0.118 \cdot F1+0.882 \cdot F2 \quad (18).$$

The first comparing means 119 compares the output signal F1 of the first filter 111 and the output signal G1 of the first mixing means 118, and the digital signal D1 corresponding to relation of which is the larger or smaller thereof is obtained. Namely, D1="L" (low potential) in a state of F1>G1, and D1="H" (high potential) in a state of F1<G1. In a similar manner, the second coomparing means 129 compares the output signal F2 of the second filter 121 and the output signal G2 of the second mixing means 128, and the digital signal D2 corresponding to relation of which is the large or small value thereof is obtained. Namely, D2="L" (low potential) in a state of F2>G2, and D2="H" (high potential) in a state of F2<G2. In a similar manner, the third comparing means 139 compares the output signal F3 of the third filter 131 and the output signal G3 of the third mixing means 138, and the digital signal D3 corresponding to relation of which is the larger or smaller value is obtained. Namely, D3="L" (low potential) in a state of F3>G3, and D3="H" (high potential) in a state of F3<G3. The output signals D1, D2, D3 of the comparing means 119, 129, 139 are input into the switching-driving part 29 as control signals of the position detecting means 28.

The switching-driving part 29, is composed of the start accelerator 30 and the selection switch 31. The start accelerator 30 outputs pulse signals L1, L2, L3 and the start command signal H for starting and accelerating the rotor 22 from a stop state to a predetermined speed. Moreover, the selection switch 31 selects one of the control signals D1, D2, D3 of the position detecting means 28 and the pulse signals L1, L2, L3 of the start accelerator 30 on the basis of the start command signal H, and generates switching signals J1, J2, J3, J4, J5, J6 of the first driving transistor and the second driving transistor by the selected signals.

The above-mentioned embodiment makes for a position detecting operation or rotation driving operation that does not become unstable by the switching operation of a control signal generator 100 of the position detecting means 28 from the output signal K of the current detecting part 35.

Hereafter, this is minutely elucidated referring figures of waveforms for elucidating operation in FIG. 11. When supply currents to the coils 23a, 23b, 23c are small, the output signal K of the current detecting part 35 is also small, and output signal M of the mixing ratio variable device 150 of the control signal generator 100 is "L". Therefore, the analog switches 110, 120, 130 are open, the mixing means 118, 128, 138 output the mixed signals G1, G2, G3 as shown by equations (11), (15), (17). The comparing means 119, 129, 139 compare the output signals F1, F2, F3 of the filters 111, 121, 131 with the mixed signals G1, G2, G3, respectively, and three phase control signals D1, D2, D3 are output. On the other hand, when the supply current to the coils 23a, 23b, 23c increases the output signal K of the current detecting part 35 also increases, and the output signal M of the mixing ratio variable device 150 of the control signal generator 100 turns to "H". Therefore, analog switches 110, 120, 130 close, and the mixing means 118, 128, 138 output the mixed signals G1', G2', G3' as shown by equations (13), (16), (18). The comparing means 119, 129, 139 compare the output signal F1, F2, F3 of the filters 111, 121, 131 with the mixed signals G1', G2', G3', respectively, and the three phase control signals D1, D2, D3 are output.

Figure 12A:
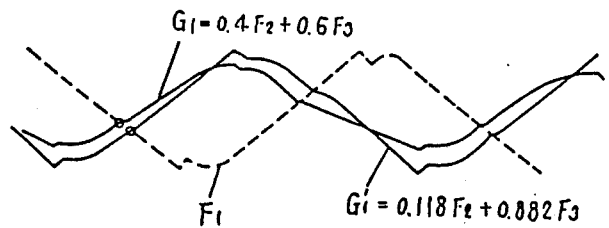
FIG. 12a and b are figures of waveforms for elucidating operation of the embodiment of FIG. 8.
Figure 12B:

The waveforms of the output signal F1 of the first filter 111 and the output signals G1, G1' of the first mixing means 118 are shown in FIG. 12(a), and the waveform of the output signal D1 of the first comparing means 119 is shown in FIG. 12(b). The solid line of FIG. 11(b) is a signal D1 which is obtained by comparing of F1 and G1, and the dotted line is signal D1 which is obtained by comparing of F1 and G1'. From this, it is found that the switching control signal D1 when the current to the coil is, varies in digital-like manner with a phase which lags behind the phase of D1 when the current is small. Namely, when the supply current to the coil is larger than a predetermined value, the converting phase from the output signal F1, F2, F3 of the filter to control signals D1, D2, D3 is delayed by operation of the current detecting part 35 and the mixing ratio variable device 150, and constitutes for an advanced portion of the phase by the above-mentioned spike voltage, so that the rotation driving operation of the brushless DC motor in the present embodiment does not become unstable.

Furthermore, in the aforementioned embodiment, an advanced portion of the phase caused by the spike voltage can be previously compensated for by suitable selection of the mixing ratio of the mixing means. Namely, the phase of the switching timing of the current pass can be easily delayed by making: Q1<W1 when the mixing ratio of the output signal F2 of the second filter 121 in the output signal G1 of the first mixing means 118 and the output signal F3 of the third filter 131 is Q1:W1, by making Q2<W2 when the mixing ratio of the output signal F3 of the third filter 131 in the output signal G2 of the second mixing means 128 and the output signal F1 of the first filter 111 is Q2:W2, and by making Q3<W3 when the mixing ratio of the output signal F1 of the first filter 111 in the output signal G3 of the third mixing means 138 and the output signal F2 of the second filter 121 is Q3:W3. In this embodiment, Q1:W1=4:6, and Q2:W2=4:6, Q3:W3=4:6.

Resistances of the resistors 153, 154, 155 of the mixing means 118, 128, 138 can be made to be R3=0.

Figure 13:
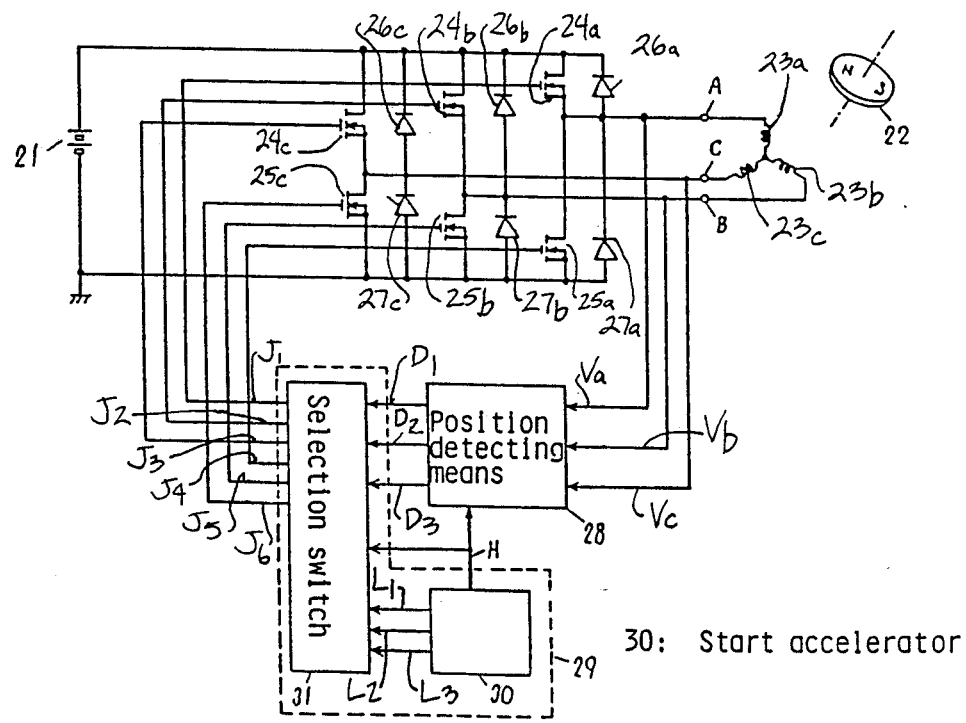
FIG. 13 is a block diagram showing a starting circuit of a brushless DC motor showing a third embodiment of the present invention.
Figure 14:
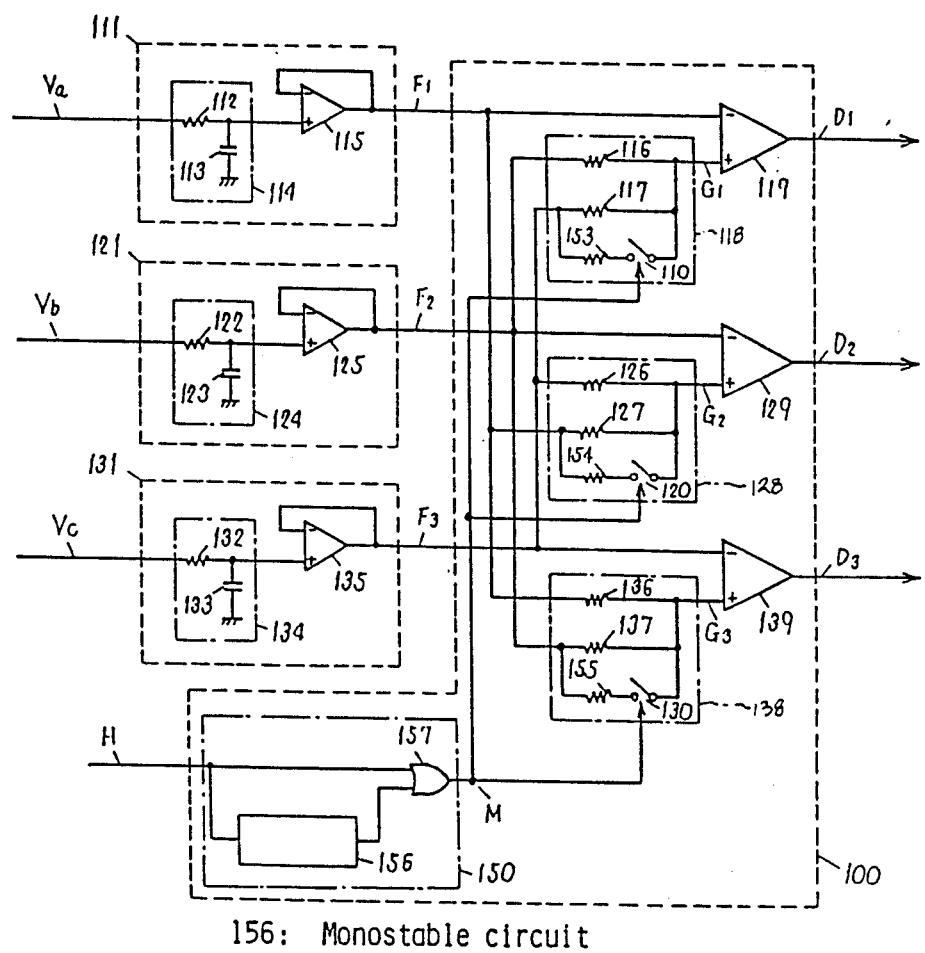
FIG. 14 is a circuit showing a construction of a position detecting part of FIG. 13.

The third embodiment of the present invention is elucidated by referring to FIG. 13 and FIG. 14.

In FIG. 14, 150 is a mixing ratio variable device of the control signal generator 100. The mixing ratio variable device 150 to which the start command signal H is input is composed of a mono-stable circuit 156 wherein the falling edge (instant of change from "H" (high potential to "L" (low potential)) of signal H is a trigger signal and an OR circuit 157. The mono-stable circuit 156 issues a pulse signal of "H" of a predetermined time period from the falling edge of the signal H. Therefore, the output signal M of the OR circuit 157 becomes a signal holding "H" for a predetermined time period after the start command signal H changes from "H" to "L".

The first mixing means 118 mixes the output signal F2 of the second filter 121 and the output signal F3 of a third filter 131, and the mixed signal G1 is obtained. When the output signal M of the mixing ratio variable device 150 is "L", the analog switch 110 is open. At this time, the mixed signal G1 is determined by the resistors 116 and 117. Furthermore, if the output signal M of the mixing ratio variable device 150 is "H", the analog switch 110 closes. If the mixed signal at this time is G1', G1' is determined by the resistors 116 and 117 and 153.

In a similar manner, the second mixing means 128 mixes the output signal F3 of the third filter 131 and the output signal F1 of the first filter 111, and the mixed signal G2 is obtained. When the output signal M of the mixing ratio variable device 150 is "L", the analog switch 120 is open. At this time, the mixed signal G2 is determined by the resistors 126 and 127. Moreover, when the output signal M of the mixing ratio variable device 150 is "H", the analog switch 120 closes. If the mixed signal at this time is G2', it is determined by the resistors 126 and 127 and 154.

In a similar manner, the third mixing means 138 mixes the output signal F1 of the first filter 111 and the output signal F2 of the first filter 121, and the mixed signal G3 is obtained. When the output signal M of the mixing ratio variable device 150 is "L", the analog switch 130 is open. At this time the mixed signal G3 is determined by the resistors 136 and 137. Moreover, when the output signal M of the mixing ratio variable device 150 is "H", the analog switch 130 closes. If the mixed signal at this time is G3', it is determined by the resistors 136 and 137 and 155.

Operation of the third embodiment is identical with the operation of the second embodiment, therefore.

INDUSTRIAL APPLICABILITY

As is obvious from the above-mentioned elucidation of the present invention, since detection of position is accomplished by using a terminal voltage arising on an input-output terminal of a three phase coil, switching of the current path to the coil can be made without special position detecting elements. Application of a brushless DC motor to a refrigerant compressor or the like becomes easy.

We claim:

1. A brushless DC motor comprising:
   a rotor having N pairs (N being an integer number) of magnetic poles having a magnetic field, the poles being provided by permanent magnets;
   a plurality of three-phase coils interacting with a magnetic flux of the magnetic field of said rotor;
   a plurality of first driving transistors having input and output terminals, the first driving transistors forming a current path from a direct current power source to said three-phase coils;
   a plurality of second driving transistors having input and output terminals, the second driving transistors forming a current return path from said three-phase coils to said direct current power source;
   a plurality of first diodes in parallel between the input terminals and the output terminals of said first driving transistors;
   a plurality of second diodes in parallel between the input terminals and the output terminals of said second driving transistors;
   a position detecting means for generating a control signal by detecting a terminal voltage on the input and output terminals to said three-phase coils;
   a switching-driving part for outputting a switching signal to said first driving transistors and to said second driving transistors on the basis of the control signal from said position detecting means, to switch the current flow to said coils in turn; and
   said position detecting means comprising:
      a filter means for producing smoothed filtered signals from said respective three-phase coil terminal voltages;
      mixing means for combining the filtered signals to produce mixed signals from said smoothed filtered signals; and
      comparing means for producing a digital signal by comparing said mixed signals, an output signal of this comparing means being a control signal of said position detecting means.

2. A brushless DC motor in accordance with claim 1, wherein:
   said smoothed filtered signals of the position detecting means are formed from the respective three-phase coil terminal voltages by a first filter, a second filter and a third filter all having first order integral characteristics;
   said mixed signals are formed by a first mixing means for mixing an output signal of said second filter and an output signal of said third filter, and a second mixing means for mixing an output signal of said third filter and an output signal of said first filter, and a third mixing means for mixing an output signal of said first filter and an output signal of said second filter; and
   said comparing means includes a first comparing means for generating a digital signal by comparing the output signal of said first filter and an output signal of said first mixing means, a second comparing means for generating a digital signal by comparing the output signal of said second filter and output signal of said second mixing means, and a third comparing means for generating a digital signal by comparing the output signal of said third filter and output signal of said third mixing means, the output signals of said first comparing means and said second comparing means and said third comparing means are issued as a control signal of said position detecting means to switch and control the current flowing states of said first driving transistors and second driving transistors.

3. A brushless DC motor in accordance with claim 1, further comprising:
   a current detecting means for detecting a supply current to said three-phase coils; and
   a variable mixing ratio means for varying a mixing ratio in the first mixing means and the second mixing means and the third mixing means corresponding to the output signal of said current detecting means;
   wherein when the supply current to a coil is larger than a predetermined value in comparison to the case when the supply current is smaller than the predetermined value, more output signal of the third filter is included in the output signal of said first mixing means, and more output signal of the first filter is included in the output signal of said second mixing means, and more output signal of second filter is included in the output signal of said third mixing means.

4. A brushless DC motor in accordance with claim 1, wherein the switching-driving means comprises:
   a start acceleration means for issuing a pulse signal for starting and accelerating the rotor from a stopped state; and
   a selection switching means for selecting a starting mode for generating switching signals from the pulse signal of said start acceleration means or selecting a normal mode for generating the switching signal from the output signal of said position detecting means.

5. A brushless DC motor in accordance with claim 1, wherein:
   said smoothed filtered signals of the position detecting means are formed from each three-phase coil terminal voltage through a first filter, a second filter, and a third filter having integration characteristics of a first order;
   said mixed signals are formed by a first mixing means for mixing an output signal of said first filter and an output signal of said second filter, a second mixing means for mixing an output signal of said second filter and an output signal of said third filter, a third mixing means for mixing an output signal of said third filter and an output signal of said first filter, and a fourth mixing means for mixing output signals of said first filter means, said second filter means and third filter means;
   said comparing means includes a first comparing means for generating a first digital signal by comparing an output signal of said first mixing means and an output signal of said fourth mixing means, a second comparing means for generating a second digital signal by comparing an output signal of said second mixing means and an output signal of said fourth mixing means, and a third comparing means for generating a third digital signal by comparing an output signal of said third mixing means and an output signal of said fourth mixing means, the output signals of said first comparing means and said second comparing means and said third comparing means are output as control signals of said position detecting means to switch and control the current flowing states of said first driving transistors and said second driving transistors.

6. A brushless DC motor comprising:
a rotor having N pairs (N being an integer number) of magnetic poles having a magnetic field, the poles being provided by permanent magnets;
a plurality of three-phase coils interacting with a magnetic flux of the magnetic field of said rotor;
a plurality of first driving transistors having input and output terminals, forming current paths from a direct current power source to said three-phase coils;
a plurality of second driving transistors having input and output terminals, the second driving transistors forming current return paths from said three-phase coil to said direct current power source;
a plurality of first diodes in parallel across the input terminals and the output terminals of said first driving transistors;
a plurality of second diodes in parallel across the input terminals and the output terminals of said second driving transistors;
a position detecting means for generating a control signal by detecting a terminal voltage on an input-output terminal of said three-phase coils;
a switching-driving means for outputting a switching signal to said first driving transistors and said second driving transistors on the basis of the control signal of said position detecting means, and for switching a current flow to said coils in the order of first terminal, second terminal, and third terminal respectively; and
said position detecting means comprising:
  a first filter having integration characteristics of a first order for smoothing the terminal voltage detected on said first terminal,
  a second filter having integration characteristics of a first order for smoothing the terminal voltage detected on said second terminal,
  a third filter having integration characteristics of a first order for smoothing the terminal voltage detected on said third terminal,
  a first mixing means for mixing an output signal of said first filter and an output signal of said second filter,
  a second mixing means for mixing an output signal of said second filter and an output signal of said third filter,
  a third mixing means for mixing an output signal of said third filter and an output signal of said first filter,
  a fourth mixing means for mixing an output signal of said first filter and an output signal of said second filter and an output signal of said third filter,
  a first comparing means for generating a first digital signal by comparing an output signal of said first mixing means and an output signal of said fourth mixing means,
  a second comparing means for generating a second digital signal by comparing an output signal of said second mixing means and an output signal of said fourth mixing means,
  a third comparing means for generating a third digital signal by comparing an output signal of said third mixing means and an output signal of said fourth mixing means, and
  said digital signals of said first comparing means and said second comparing means and said third comparing means are output as control signals of said position detecting means to switch and control the current flowing states of said first driving transistors and second driving transistors.

7. A brushless DC motor in accordance with claim 6, wherein the output signal of said first mixing means is delayed by a predetermined phase relationship to the output signal of said first filter, the output signal of said second mixing means is delayed by a predetermined phase relationship to the output signal of said second filter, and the output signal of said third mixing means is delayed by a predetermined phase relationship to the output signal of said third filter by selecting a mixing ratio in the first mixing means and the second mixing means and the third mixing means.

8. A brushless DC motor comprising:
a rotor having N pairs (N being an integer number) of magnetic poles having a magnetic field, the poles provided by permanent magnets;
a plurality of three-phase coils interacting with a magnetic flux of the magnetic field of said rotor;
a plurality of first driving transistors having input and output terminals, the first driving transistors forming current paths from a direct current power source to said three-phase coils;
a plurality of second driving transistors having input and output terminals, the second driving transistors forming current return paths from said three-phase coils to said direct current power source;
a plurality of first diodes in parallel across input terminals and output terminals of said first driving transistors;
a plurality of second diodes in parallel across input terminals and output terminals of said second driving transistors;
a position detecting means for generating a control signal by detecting terminal voltages on input-output terminals to said three-phase coils;
a switching-driving means for issuing a switching signal of to said first driving transistors and said second driving transistors on the basis of the control signal of said position detecting means, and for switching and flowing a current to said coils sequentially in the order of a first terminal, a second terminal, and a third terminal;
a current detecting means for detecting supply current to said coils; and
said position detecting means comprising:
  a first filter having integration characteristics of a first order for smoothing a terminal voltage detected on said first terminal,
  a second filter having integration characteristics of a first order for smoothing a terminal voltage detected on said second terminal,
  a third filter having integration characteristics of a first order for smoothing a terminal voltage detected on said third terminal,
  first mixing means for mixing an output signal of said second filter and an output signal of said third filter, second mixing means for mixing an output signal of said third filter and an output signal of said first filter,
third mixing means for mixing an output signal of said first filter and an output signal of said second filter,
first comparing means for generating a first digital signal by comparing the output signal of said first filter and an output signal of said first mixing means,
second comparing means for generating a second digital signal by comparing the output signal of said second filter and an output signal of said second mixing means,
third comparing means for generating a third digital signal by comparing the output signal of said third filter and an output signal of said third mixing means,
a variable mixing ratio means for varying a mixing ratio in said first mixing means and said second mixing means and said third mixing means corresponding to the output signal of said current detecting means in a manner such that when the supply current to said coil is larger than a predetermined value in comparison to the case when the output current is smaller than the predetermined value, more output signal of said third filter is included in the output signal of said first mixing means, and more output signal of said first filter means is included in the output signal of said second mixing means, and more output signal of said second filter means is included in the output signal of said third mixing means,
said digital signals of said first mixing means and said second mixing means and said third mixing means are issued as control signals of said position detecting means to switch and control the current flowing states of said first driving transistors and second driving transistors.

9. A brushless DC motor in accordance with claim 8 having voltage phase shift compensation, wherein:
a mixing ratio of the output signal of the second filter to the output signal of the third filter in the output signal of the first mixing means is less than one;
a mixing ratio of the output signal of said third filter to the output signal of the first filter in the output signal of the second mixing means is less than one; and
a mixing ratio of the output signal of the first filter and the output signal of the second filter in the output signal of the third mixing means is less than one.

* * * * *

UNITED STATES PATENT AND TRADEMARK OFFICE
CERTIFICATE OF CORRECTION

PATENT NO. : 4,888,533

DATED : December 19, 1989

INVENTOR(S) : GOTOH et al.

It is certified that error appears in the above-identified patent and that said Letters Patent is hereby corrected as shown below:

Under the heading:

Add:

[73] Assignee: Matsushita Electric Industrial Co., Ltd., Kodama, Japan
and
Matsushita Refrigeration Company, Higasiosaka, Japan Signed and Sealed this Eighteenth Day of December, 1990

*Attest:*

HARRY F. MANBECK, JR.

*Attesting Officer*  *Commissioner of Patents and Trademarks*